United States Patent [19]
Lee

[11] Patent Number: 5,889,560
[45] Date of Patent: *Mar. 30, 1999

[54] MPEG VIDEO DECODER

[75] Inventor: Seong-Won Lee, Seoul, Rep. of Korea

[73] Assignee: Samsung Electronics, Co., Ltd., Suwon, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 731,511

[22] Filed: Oct. 15, 1996

[30] Foreign Application Priority Data

Dec. 10, 1995 [KR] Rep. of Korea .................. 1995-35201

[51] Int. Cl.$^6$ .............................. H04N 7/12; H04N 11/02; H04N 11/04
[52] U.S. Cl. .......................... 348/402; 348/405; 348/419; 341/65; 341/67; 358/261.1; 358/427
[58] Field of Search ..................................... 348/402, 405, 348/419, 423, 845, 845.2; 358/261.1, 427; 341/65, 67; H04N 7/12, 11/02, 11/04

[56] References Cited

U.S. PATENT DOCUMENTS

| 4,799,149 | 1/1989 | Wolf | 364/200 |
| 5,504,530 | 4/1996 | Okikane et al. | 348/413 |
| 5,510,840 | 4/1996 | Yonemitsu et al. | 348/402 |
| 5,574,504 | 11/1996 | Yagasaki et al. | 348/415 |
| 5,610,630 | 3/1997 | Nakamura et al. | 345/119 |

Primary Examiner—Richard Lee
Assistant Examiner—Nhon T. Diep
Attorney, Agent, or Firm—Marger Johnson & McCollom, P.C.

[57] ABSTRACT

A video decoder that operates according to MPEG (Moving Picture Experts Group) standards. The video decoder includes a parsing stage including inverse quantization and run-length decoding. An inverse transform stage and a compensating stage are then performed. Run-length decoding is performed just prior to the inverse transform stage and after the inverse quantization reducing the total number of pipelines and reducing the number of buffers.

9 Claims, 2 Drawing Sheets

MPEG VIDEO DECODER

BACKGROUND OF THE INVENTION

(1) Field of the Invention

The present invention relates to a video decoder according to MPEG-2, 11/1993 (Moving Picture Experts Group) standards. More specifically, it relates to a video decoder which performs the step of run-length decoding just before the step of inverse transformation so that the number of pipelines can be reduced and also the number of buffers can be reduced.

(2) Description of the Prior art

The growth of multimedia is based on the image compression techniques and progress in digitization. New techniques for digitizing data has been developing rapidly. Accordingly, image compression techniques, which are the basis for the growth of multimedia, are becoming more and more important.

MPEG, which was born in such a technical environment, is the international standards for the compression and encodement of a digital dynamic image, MPEG is an essential technique in the multimedia environment.

MPEG standardization is related to MPEG Video, MPEG Audio and MPEG systems. MPEG Video standardizes algorithms for compressing a video signal. MPEG Audio standardizes algorithms for compressing an audio signal. MPEG system addresses problems of synchronizing and multiplexing the compressed video and audio bit streams for multistages.

A function of MPEG is to remove redundancy between frames. MPEG adds to the frame compression functions of JPEG (Joint Photograph Experts Group), standards for compressing static images.

Before describing a video decoder that performs to MPEG standards, the process of encoding an MPEG video signal will is explained.

The process of encoding an MPEG video signal comprises the steps of preprocessing, transformation, quantization, and variable length coding.

In the step of preprocessing, digital image data is sampled or filtered causing a screen to have a prescribed size.

The step of transformation draws relationship between data. Waveform coding such as adaptive differential pulse code modulation (ADPCM), and transformation coding using discrete cosine transformation (DCT) are widely used in the transformation step.

If the discrete cosine transformation method is used, a phenomenon appears in which correlation between the calculated coefficients is little and energy is concentrated into low frequencies. In this case, if processing is performed in the subsequent quantization step, an image of high quality can be obtained with high compressibility.

In the step of quantization, transformed data is represented by a restricted number of bits to reduce data size.

In the step of variable length coding, the data values which, statistically, appear frequently are represented by a small number of bits, data values which appear rarely are represented by a large number of bits. Thus, the total number of bits is reduced.

Bit streams, which are obtained in the above step of variable length coding, are packeted, then recorded in recording media such as a compact disk (CD) or a hard disk, or transmitted through a cable transmission channel or a radio communication channel.

Bit streams, which are recorded or transmitted as above, are reproduced into a video signal by an MPEG video decoder.

In the following, a prior art MPEG video decoder will be described in conjunction with the accompanying drawing. FIG. 2 is a block diagram showing a conventional MPEG video decoder. As shown in FIG. 2, a prior art MPEG video decoder comprises: a syntax parser 210, a variable length decoder 212, run-length decoder 214 and a parameter decoder 216, all of which perform the step of parsing. A block buffer 220 interfaces the steps of parsing and of inverse quantization; an inverse quantizer 230 and an inverse scanner 232, all of which perform the step of inverse quantization. A block buffer 240 interfaces the steps of inverse quantization and of inverse transformation. An inverse discrete cosine transformer 250 which performs the step of inverse transformation. A macro block buffer 260 interfaces the steps of inverse transformation and of compensation. A motion compensator 270 performs the step of compensation.

As described above, a prior art MPEG video decoder has four pipeline stages including the steps of parsing, inverse quantization, inverse transformation, and compensation.

An MPEG video decoder which has the above structure performs decoding in the following order:

Syntax parser 210→Variable length decoder 212→Run-length decoder 214→Block buffer 220→Inverse quantizer 230→Inverse scanner 232→Block buffer 240→Inverse discrete cosine transformer 250→Macro block buffer 260→Motion compensator 270.

If decoding is performed in such order, three buffers are required, and the total number of pipeline stages will be four. If the number of pipeline stages is larger, control will be more complex and a larger number of buffers are required.

SUMMARY OF THE INVENTION

It is therefore an object of the present invention to solve the problems of the prior art by providing a new MPEG video decoder. The new MPEG video decoder changes the order of decoding so that run-length decoding is performed just before the inverse discrete cosine transformation. This reordering reduces the number of pipeline stages from four to three. Fewer stages make control easier, and reduces the number of required buffers.

The present invention makes use of the fact that, in the steps of parsing and of inverse quantization in prior art video decoders, inverse quantization, inverse scanning, and run-length decoding can be performed in any order.

The present invention herein incorporated by reference, Korean Patent Application No. 95-950 by the same applicant, entitled "Inverse scanner and run-length decoder utilizing memory addressing of inverse quantizer".

The present invention comprises a parsing part which receives a compressed bit stream according to MPEG. The bit stream is separated into prescribed parameters and data. The parameters are decoded and variable length decoding, inverse quantization, inverse scanning and run-length decoding performed successively on the data. The data is then output in blocks.

An inverse transformation stage receives parameters and data from the parsing stage, performs an inverse discrete cosine transformation on the data and outputs data in macro blocks. A compensation stage receives data from the inverse transformation stage, combines a frame formed out of the data with a prescribed reference frame to produce motion-compensated data and outputs the data as a video signal.

Between the parsing stage and the inverse transformation stage, a block buffer is used to interface data blocks. A macro block buffer is used between the inverse transformation stage and the compensation stage to interface macro block data.

In the above structure of the present invention, run-length decoding is performed in a final processing step of the parsing stage, in order to reduce the number of pipeline stages.

DETAILED DESCRIPTION OF THE PREFERRED EMBODIMENTS

In the following, preferred embodiments of the present invention will be described in detail in conjunction with the accompanying drawings.

Figure 1:
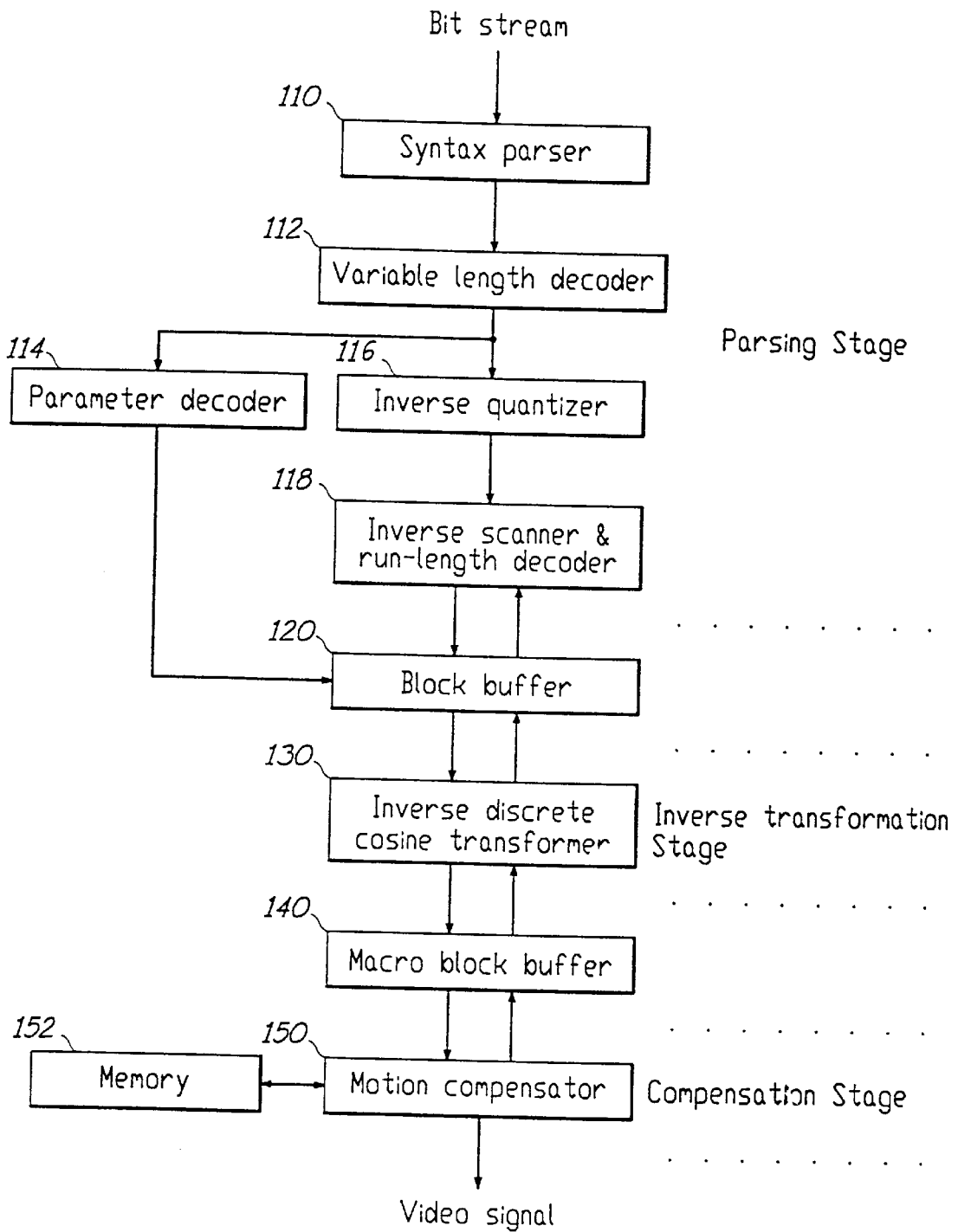
FIG. 1 is a block diagram which shows an MPEG video decoder according to an embodiment of the present invention.
Figure 2:
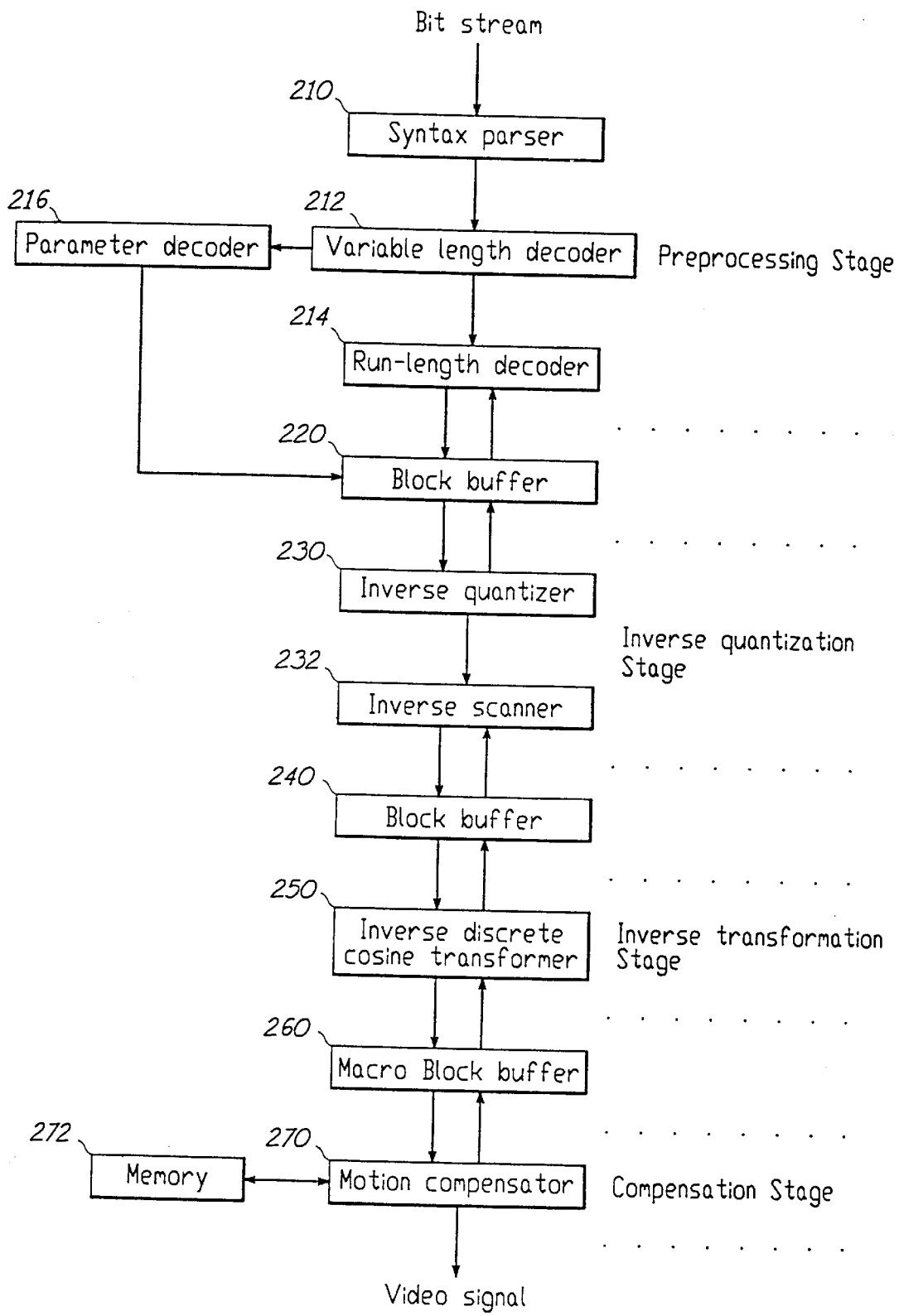
FIG. 2 is a block diagram which shows a conventional MPEG video decoder.

FIG. 1 is a block diagram which shows an MPEG video decoder according to an embodiment of the present invention.

As shown in FIG. 1, the MPEG video decoder comprises a syntax parser 110, a variable length decoder 112, an inverse quantizer 116, and an inverse scanner and run-length decoder 118, all connected in series. A block buffer 120 is connected to the output of the inverse scanner and run-length decoder 118 so that data may be transmitted bi-directionally. A parameter decoder 114 which is connected to the output of said variable length decoder 112 for receiving data and is connected to said block buffer 120 to transmit data. An inverse discrete cosine transformer 130, a macro buffer 140, and a motion compensator 150 are connected in series to the block buffer 120 so that data may be transmitted bi-directionally. A memory 152 is connected to the compensator 150 so that data can be accessed by the compensator.

A bit stream is applied or input to the syntax parser 110, and a video signal is output from the motion compensator 150.

A block synchronization method is used in the MPEG video decoder according to an embodiment of the present invention. Interfacing between blocks is performed basically on the basis of asynchronous pipelining. In other words, current block in a stage is output only when the next stage is in a ready state. Further, if the operation of the current stage is not completed, the output is held temporarily.

Each stage transmits a ready signal to the preceding stage and a hold signal to the next stage. If the cycles for the stages vary with each, there will be long hold times.

In order to prevent long hold times, dual buffers are provided in the front and rear of each stage and to prevent a process for one input unit from stopping. In such a structure, a ready signal and a hold signal are transmitted for the buffers. That is, "Buffer is empty." or "Buffer is full." is transmitted to the preceding and the next stages.

Blocks in each stage constitute a synchronous pipeline. Thus, when a stage begins to operate, a transmission time from input to output is always the same.

As shown in FIG. 1, the entire pipeline of an MPEG video decoder comprises three stages. The first stage is a parsing stage, which operates at a symbol rate and in a block unit. A syntax parser 110, a variable length decoder 112, a parameter decoder 114, an inverse quantizer 116, and an inverse scanner and run-length decoder 118 are components for performing the parsing stage.

The second stage is an inverse transformation stage, which operates at a pixel rate and in a block unit. An inverse discrete transform 130 performs the inverse transformation.

The third stage is a compensation stage, which operates at a pixel rate and in a macro block unit. A motion compensator 150 and a memory 152 are components for performing the compensation stage.

The operation of each stage will be described in detail with reference to FIG. 1. When power is applied, the circuit begins to operate. A bit stream, which has been transmitted through recording media such as a compact disk (CD), etc., or a transmission channel, is input to the syntax parser 110.

The bit stream is separated into parameters and data in the syntax parser 110. Variable length decoding is performed for the data and variable length encoded parameters in the variable length decoder 112.

Parameters and data are output from the variable length decoder 112. Parameters which have been separated in the syntax parser 110 are input to the parameter decoder 114, decoded and then output to the block buffer 120. These parameters include system parameters used by external systems, parameters used for setting the status of each decoder, and parameters related to the process of decoding.

The data output from the variable length decoder 112 is decoded by the inverse quantizer 116 and subsequently by the inverse scanner and run-length decoder 118. The decoded data is output in blocks to the block buffer 120. At the end of the process in each block, a decision is made whether to hold or not to hold the process. The decision is made by checking on the existence of a ready signal from the block buffer 120. Data with a size greater than a macro block is refreshed by the synchronization signal of each level and transmitted to the next stage through the block buffer 120.

Run-length decoding is performed at the end of the parsing stage. If run-length decoding is performed earlier, the number of pipeline stages will be larger.

In the parsing stage, the steps of variable length decoding, inverse quantization, and inverse scanning and run-length decoding are processed in symbol units. All steps except variable length decoding can be performed in any order.

After receiving a ready signal from the block buffer 120, the inverse discrete cosine transformer 130 receives the data from the block buffer 120. The format for data transmitted from the block buffer 120 to the inverse discrete cosine transformer 130, comprises parameters, the number of blocks, and incompressed discrete cosine transformation coefficients. All parameters are transmitted to the compensation stage. The inverse discrete cosine transformation begins only when a ready signal is received from the macro block buffer 140.

The macro block buffer 140 transmits a ready signal when all the prescribed number of blocks have been processed. At this point, the inverse discrete cosine transform 130 stores parameters whose size is greater than a macro block and performs inverse discrete cosine transformation, prior to the process of the first block. Also, a parameter ready signal is transmitted to the compensation stage.

The motion compensator 150, after receiving a ready signal of the macro block buffer 140, processes data from the macro block buffer 140. When the motion compensation of the preceding macro block is completed and a reference frame is needed, the motion compensator 150 begins to read in a reference frame from the memory 152 after receiving a parameter ready signal. The motion compensator can begin reading in a reference frame even when a ready signal has not yet arrived from the macro block buffer 140.

The motion compensator 150 combines the reference frame with a frame formed out of the preceding macro block. If the combination is finished, the motion compensator 150 does not perform compensation even if a ready signal is arrived from the macro block buffer 140.

Data constituting the combined frame is provided as a video signal output. Compensation is then performed by a vertical synchronous signal (VSYNC).

As shown above, an MPEG video decoder has a changed order of decoding. Run-length decoding and inverse scanning have also been combined to be performed together. The resultant MPEG video decoder has a reduced total number of pipeline stages. The reduction of the number of pipeline stages makes control easier and reduces the number of buffers.

What is claimed is:

1. An MPEG video decoder comprising:

a parsing stage receiving a compressed bit stream according to MPEG, separating the bit stream into parameters and data, the parsing stage decoding the parameters and pipelining the data through variable length decoding, inverse quantization, inverse scanning and run-length decoding in succession, and outputting the data in blocks, the inverse quantization receiving the data unbuffered directly after the variable length decoding and conducted before the inverse scanning and run-length decoding thereby eliminating any block buffering while pipelining the data through the parsing stage, the run length decoding performed as a final processing step of the parsing stage;

an inverse transformation stage receiving the decoded parameters and pipelined data immediately after the run length decoding performed in the parsing stage and performing inverse discrete cosine transformation on the blocks of data from the parsing stage, the inverse transform stage outputting the data in macro blocks; and a compensation stage receiving data from the inverse transformation stage, forming a frame out of the data and combining the frame with a reference frame to produce motion-compensated data, the compensation stage outputting the data as a video signal.

2. A video decoder according to claim 1, including:

a block buffer directly coupling the run-length decoded pipelined data blocks from the parsing stage with the inverse transformation stage; and a macro block buffer providing direct pipelining of the data in macro blocks between the inverse transformation stage and the compensation stage.

3. A video decoder according to claim 2, wherein the parsing stage comprises:

a syntax parser receiving the bit stream and outputting the data and parameters separated from the bit stream;

a variable length decoder receiving the output of the syntax parser and outputting the variable length decoded data and parameters;

a parameter decoder decoding the parameters output from the syntax parser and the variable length decoder and transmitting the decoded parameters to the block buffer;

an inverse quantizer performing the inverse quantization on the data and parameters output from the variable length decoder;

a combined inverse scanner and run-length decoder coupled in series after the inverse quantizer and immediately before the inverse transformation stage performing inverse scanning on the inverse quantized data and run-length decoding on the inverse scanned data in a continuous data pipeline without buffering the data, and transmitting the run-length decoded data in blocks to the block buffer.

4. A video decoder according to claim 3 wherein the parameters output from the variable length decoder include system parameters used by external systems, parameters for setting the status of each decoder, and parameters used during data decoding.

5. A pipelined MPEG video decoder comprising:

a pipelined parsing stage for receiving a MPEG compressed bit stream and separating the bit stream into parameters and data, the parsing stage including the following:

a variable length decoder having an input receiving the data and an output, inverse quantizer having an input coupled in series to the output of the variable length decoder and an output, and an inverse scanner having an input coupled in series to the output of the inverse quantizer and an output;

a run-length decoder comprising a last processing element in the pipelined parsing stage, the run-length decoder having an input coupled to the output of the inverse scanner and an output;

an inverse transform stage receiving the output from the run-length decoder in the parsing stage and performing an inverse discrete cosine transformation on the data from the parsing stage; and a compensation stage coupled to the inverse transform stage for producing motion-compensated data and outputting the motion-compensated data as a video signal.

6. An MPEG video decoder according to claim 5 including a first block buffer coupled between the parsing stage and the inverse transform stage and a second block buffer coupled between the inverse transform stage and the motion compensation stage.

7. A method for decoding an MPEG bit stream, comprising:

parsing the bit stream according to MPEG and separating the bit stream into parameters and data;

pipelining the data directly into a variable length decoder;

pipelining the data from the variable length decoder directly into an inverse quantized;

pipelining the data from the inverse quantizer directly into an inverse scanner;

pipelining the data from the inverse scanner directly into a run-length decoder;

inverse transforming the data immediately after being output from the run-length decoder; and motion compensating the inverse transformed data.

8. A method according to claim 7 including forming frames out of the motion compensated data;

combining the frames with a reference frame to produce motion-compensated data; and outputting the motion-compensated data as a video signal.

9. A method according to claim 7 including the following steps:

forming the run-length decoded data into data blocks;

buffering the data blocks;

inverse quantizing the data blocks;

forming the inverse transformed data into macro-blocks;

buffering the macro-blocks; and motion compensating the buffered macro-blocks.

* * * * *